Patented Dec. 13, 1938

2,140,259

UNITED STATES PATENT OFFICE 2,140,259

ACCELERATORS OF VULCANIZATION

Albert M. Clifford, Stow, Ohio, assignor to Wingfoot Corporation, Wilmington, Del., a corporation of Delaware No Drawing. Application September 26, 1935, Serial No. 42,305

2 Claims. (Cl. 18—53)

This invention relates to a method of treating rubber. More particularly, it relates to the acceleration of the rate of vulcanization of rubber by the use of an amino alkyl alcohol in which the alkyl radical is substituted by a primary amine residue of aliphatic characteristics.

One object of the invention is to provide a class or organic compounds, some of them new materials, which are good accelerators of the vulcanization of rubber. A second object is to provide an improved process of vulcanizing rubber. Another object is to provide rubber products of good physical properties vulcanized in the presence of the said accelerators. Other objects and advantages will become apparent as the description of the invention proceeds.

Compounds coming within the scope of the invention have the formula R—NH—X—OH, in which R—NH— is a primary amine residue having aliphatic characteristics and X is alkylene, including alicyclic.

These materials may conveniently be prepared by either of the following reactions:

(1) R—NH$_2$+Cl—X—OH ⟶ R—NH—X—OH+HCl (2) 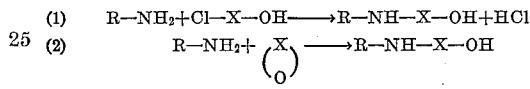 ⟶ R—NH—X—OH

The primary amines used in the invention may be strictly aliphatic such as butyl amines, allyl amines, ethylene diamine, and propyl amines. They may also be alicyclic primary amines such as cyclohexyl amine and decahydro naphthyl amine. Still others are ring substituted aliphatic amines such as benzyl amine, beta phenyl ethyl amine, phenyl propyl amine, furfuryl amine, and tetrahydrofurfuryl amine.

Thus, the amines capable of use in preparing the compounds of the invention are primary amines having straight chain and cycloaliphatic radicals and also ring substituted aliphatic groups, in which the substituent rings may be saturated or unsaturated, carbocyclic or heterocyclic. For convenience, the residues of the primary amines used in practicing the invention will be referred to as "primary amine residues of aliphatic characteristics" by which term the aforementioned radicals are included.

If the first of the above reactions is used in preparing the compounds of the invention, halogen hydrins are employed. Exemplary are ethylene chlorhydrin, propylene chlorhydrin, butylene chlorhydrin and other members of the homologous series. Also, other halogen hydrins, such as the brom hydrins, may be employed in place of the chlor hydrins.

Equimolecular proportions of amine and chlorhydrin are mixed and gently heated under reflux. An exothermic reaction takes place. The resulting product, which is generally a liquid, is treated with a concentrated solution of sodium hydroxide and the oily layer consisting of a mixture of the reaction product and unchanged reactants is separated and subjected to distillation, the less volatile compounds preferably under reduced pressure.

If, instead of equimolecular proportions, two mols of amine are used with one mol of chlorhydrin, the excess of amine reacts with the hydrochloric acid produced forming a hydrochloride, which may be solid and separable by decantation or filtration or if liquid can be easily separated by washing the mixed product with water.

Also, in some cases, it may be desirable to carry out the reaction in the presence of a hydrochloric acid absorbent such as sodium carbonate, thereby eliminating the caustic treatment for the purification of the product as used in the first procedure outlined.

The following materials illustrative of the invention are liquids of amine-like odor, soluble in water, alcohol, and ether.

| Compound | Boiling point |
|---|---|
| N (beta hydroxyethyl) ethylene diamine | 230–240° C/760 mm. |
| Beta butylamino ethyl alcohol | 90–145° C/7 mm. |
| Beta allylamino ethyl alcohol | 90–110° C/8 mm. |
| Beta cyclohexyl amino ethyl ahcohol | 120–180° C/8 mm. |

The above four compounds may be prepared by reacting in the manner above described ethylene chlorhydrin with ethylene diamine, butylamine, allylamine, and cyclohexyl amine, respectively.

Other illustrative compounds of the amino alkyl alcohols in which the alkyl radical is substituted by a primary amine residue of aliphatic characteristics which may be used in the practice of the invention are beta ethyl amino ethyl alcohol, beta n-propyl amino ethyl alcohol, beta iso propyl amino ethyl alcohol, beta amyl amino ethyl alcohol, beta heptyl amino ethyl alcohol, beta o-methyl cyclohexyl amino ethyl alcohol, and beta o- or p-ethoxy cyclohexyl amino ethyl alcohol. Still others are beta n-butyl amino propyl alcohol, ethyl amino cyclohexanol, beta isopropyl amino propyl alcohol, 4 n-butyl amino butanol, β(β' phenyl ethyl) amino ethyl alcohol, beta tetrahydro alpha furfuryl amino ethyl alcohol, beta benzyl amino ethyl alcohol, ethyl amino octyl alcohol, methyl amino heptyl alcohol, beta decahydro naphthyl amino ethyl alcohol, etc.

Any of the products described may be employed as accelerators of vulcanization in most of the ordinary rubber compounds. However, the following is a specific example of a formula in which they have been found by experience to yield excellent results.

| | Parts by weight |
|---|---|
| Rubber (acetone extracted) | 100 |
| Zinc oxide | 5 |
| Sulphur | 3 |
| Stearic acid | 1.5 |
| Accelerator | 0.5–1.0 |

In order to test the efficiency of the accelerators of the invention, illustrative members of the class were incorporated into samples of rubber prepared in accordance with the preceding formula and the samples were then subjected to vulcanization for varying periods of time. The results of the tests on four typical compounds are tabulated below.

| Cure in minutes at °F. | Tensile in kgs/cm.$^2$ | | | Ultimate elongation |
|---|---|---|---|---|
| | Ultimate | 500% | 700% | |
| *N (beta hydroxy ethyl) ethylene diamine (0.5 part)* | | | | |
| 15/260 | 66 | 11 | 28 | 870 |
| 30 | 116 | 17 | 55 | 835 |
| 40 | 146 | 19 | 65 | 845 |
| 60 | 164 | 24 | 91 | 800 |
| *Beta allyl amino ethyl alcohol (1.0 part)* | | | | |
| 50/285 | 98 | 13 | 35 | 890 |
| 60 | 108 | 14 | 39 | 875 |
| 70 | 112 | 14 | 42 | 865 |
| 80 | 107 | 15 | 46 | 840 |
| *Beta butyl amino ethyl alcohol (1.0 part)* | | | | |
| 35/285 | 102 | 14 | 40 | 865 |
| 60 | 106 | 14 | 44 | 845 |
| 70 | 120 | 14 | 44 | 865 |
| 80 | 125 | 15 | 48 | 855 |
| *Beta cyclohexyl amino ethyl alcohol (1.0 part)* | | | | |
| 35/285 | 110 | 13 | 36 | 895 |
| 45 | 119 | 15 | 47 | 850 |
| 60 | 127 | 19 | 65 | 805 |
| 70 | 144 | 22 | 76 | 800 |

Although the preferred forms of the invention have been described in detail, it will be apparent to those skilled in the art that the invention is not limited thereto but that various modifications may be made therein without departing from the spirit of the invention or from the scope of the appended claims, wherein it is intended to claim all features of patentable novelty inherent in the invention.

What I claim is:

1. The method of accelerating the vulcanization of rubber which comprises vulcanizing it in the presence of a compound having the formula R—NH—X—OH in which X is alkylene and R is an alicyclic radical corresponding to the benzene and naphthalene series.

2. The method of accelerating the vulcanization of rubber which comprises vulcanizing it in the presence of cyclohexyl amino ethyl alcohol.

ALBERT M. CLIFFORD.